United States Patent

Cannon

[11] Patent Number: 6,035,631
[45] Date of Patent: Mar. 14, 2000

[54] SAFETY IN SOLID FUEL ROCKET MOTORS

[75] Inventor: Bernard A. Cannon, Redditch, United Kingdom

[73] Assignee: Royal Ordnance Public Limited Company, Lancashire, United Kingdom

[21] Appl. No.: 09/002,778

[22] Filed: Jan. 5, 1998

Related U.S. Application Data

[63] Continuation of application No. PCT/GB96/01525, Jun. 21, 1996.

[30] Foreign Application Priority Data

Jul. 4, 1995 [GB] United Kingdom .................. 9513561

[51] Int. Cl.[7] ................................ F02K 9/00; F42B 15/36
[52] U.S. Cl. ................................ 60/255; 60/253; 60/223; 220/89.2
[58] Field of Search ................................ 60/253, 255, 223, 60/271; 239/265.15; 220/89.2; 102/481, 377

[56] References Cited

U.S. PATENT DOCUMENTS

| | | | |
|---|---|---|---|
| H1144 | 3/1993 | Cherry et al. ........................ | 102/481 |
| 3,887,991 | 6/1975 | Panella ................................. | 60/223 |
| 5,035,181 | 7/1991 | Jacks et al. .......................... | 102/481 |
| 5,044,154 | 9/1991 | English, Jr. et al. ................ | 60/255 |
| 5,155,298 | 10/1992 | Koontz ................................ | 102/481 |
| 5,311,820 | 5/1994 | Ellinsen ............................... | 60/223 |
| 5,792,981 | 8/1998 | Singer et al. ....................... | 60/223 |

*Primary Examiner*—Ted Kim
*Attorney, Agent, or Firm*—Nixon & Vanderhye P.C.

[57] ABSTRACT

A solid fuel propellant motor casing is described, the casing comprising a body portion for containing the propellant, the body portion also including at least one detachable end closure portion, the closure portion being maintained in position relative to said body portion by retaining means, the retaining means being held in position with engagement means on an inner surface of said body portion and located radially with respect to said body portion by locating means against resilient biasing means, said locating means being responsive to temperature such that said locating means melt at a predetermined temperature allowing said resiliently biased retaining means to move radially inwardly of said body portion and allow said at least one closure portion to be ejected from the casing.

24 Claims, 3 Drawing Sheets

SAFETY IN SOLID FUEL ROCKET MOTORS

This is a continuation of PCT application No. PCT/GB96/01525, filed Jun. 21, 1996.

BACKGROUND OF THE INVENTION

1. Field of the Invention

The present invention relates to solid fuel propellant motors and in particular to means for reducing the hazard of unwanted ignition of such motors due to slow extraneous heating.

We refer to our copending patent application number PCT/GB96/00325 the content of which is included herein by reference. In particular, this reference describes a device to mitigate the effects of unwanted extraneous heating under so-called "slow cook-off" conditions.

2. Discussion of Prior Art

Explosive materials can be broadly divided into those which are intended to detonate and those which are intended to ignite or burn, albeit very rapidly. The present invention is mainly concerned with the latter type of material, an example of which is propellant material used for applications such as rocket motors.

Propellant materials, based for example on nitrocellulose (NC) or mixtures of nitrocellulose and nitroglycerine (NG), when subjected to extraneous heating at a relatively rapid rate will generally react by producing an ignition event where the material burns rather than detonates. The temperature at which this ignition event occurs is dependent on the heating rate of the material. A typical ignition temperature range for propellants based on cast NC/NG matrices is about 160 to 180° C. at, for example, a heating rate of 5° C. per minute. However, although undesired ignition of a propellant motor is a serious and dangerous event, the potentially more dangerous event of explosive detonation may occur when the material is subjected to a very low heating rate. A heating rate of about 0.05° C. per minute, for example, from ambient temperature may cause detonation at a temperature of about 120° C.

During a detonation event, substantially all molecules of the material release their chemical energy simultaneously. A slow heating rate serves to bring the majority or all of the molecules in the motor matrix to an energy level where the next increment of heat input takes the material above an activation energy "barrier" to promote a simultaneous reaction causing a detonation event.

Under conditions of low heating rate it is desirable to be able to stimulate an ignition at a lower energy level and cause the material to burn prior to detonation taking place. However, even the burning of a solid fuel propellant motor in a restricted environment is an extremely hazardous event. The rate of burning of a solid fuel propellant is very high and is dependent, inter alia, on the gas pressure and temperature conditions within the motor easing. Normally, a solid fuel motor may be fully consumed within a few seconds. However, if the same fuel is ignited under normal atmospheric pressure without the pressure being allowed to increase substantially, the rate of burning is very much slower, and consequently, much less hazardous.

EP-A-0334731 describes a device using a low melting point alloy effectively as an adhesive between two coaxial surfaces, one surface on a motor body and the other surface on a closure. On heating the low melting point alloy melts and allows ejection of the closure by springs acting in the axial direction. However, the low melting point alloy does not provide sufficient strength to retain the closure during normal firing operation of the motor. Consequently, an additional locking ring is needed that must be rotated into position prior to firing and thus adding unnecessary expense, complexity and potential unreliability to the device. Furthermore, the low melting point alloy must be cast in-situ thus further increasing cost and complexity of manufacture.

U.S. Pat. No. 5,311,820 describes a device whereby a motor closure may be retained in a motor body. This device employs two sections of overlapping tube having aligned corresponding grooves on the outside of the inner tube and on the inside of the outer tube, there being an internal spring retainer provided to lock the two tube components together. The groove in the outer tube is sufficiently deep so as to completely accommodate the spring retainer and so not engage the groove in the inner tube. Grub screws are used to force the spring retainer into the inner groove, and so cause the two tubes to be locked together. One by one the grub screws are removed and molten low melting point alloy cast in the vacant holes and allowed to solidify. When all the grub screws have been replaced, the key is maintained in the engaged position only by the low melting point alloy. On extraneous heating the low melting point alloy melts and the spring retainer springs out completely into the groove in the outer tube thus releasing the closure. This device has three major engineering disadvantages. The first is that the spring retainer ring is unlikely to move outwardly and submerge into the outer groove in a consistent and reliable manner such that a clean separation of the closure member is unlikely to occur. Secondly, the device increases the necessary outer diameter of the motor which is undesirable. Thirdly, the radial ejection of the low melting point alloy on melting means that the motor cannot be contained within a continuous outer skin or air frame. Fourthly, the necessity of sequentially removing grub screws and casting low melting point alloy into the holes is time consuming and adds to the cost of the device.

U.S. pat. No. 5,035,181 is specifically for use for fuses on bombs and shells. The device described can only be used where the shock wave propagates faster than the speed of sound, and therefore, has no relevance to pressure vessels such as rocket motor bodies.

SUMMARY OF THE INVENTION

The object of the present invention is to provide a means of preventing a pressure build up within a solid fuel propellant motor casing in the event of unwanted ignition thereof and which does not have the disadvantages of the prior art devices and methods.

According to a first aspect of the present invention, there is provided a solid fuel propellant motor casing, the casing comprising a body portion for containing the propellant, the body portion also including at least one detachable closure portion, the closure portion being maintained in position relative to said body portion by retaining means, the retaining means being held in position with engagement means on an inner surface of said body portion and located radially with respect to said body portion by locating means against resilient biasing means, said locating means being responsive to temperature such that said locating means melt at a predetermined temperature allowing said retaining means to move radially inwardly of said body portion and allow said at least one closure portion to be ejected from the casing.

The at least one closure portion may be, for example, a rocket nozzle portion through which the propellant motor efflux passes under normal conditions of use. Alternatively, the at least one closure portion may be a forward portion of a missile vehicle, for example, comprising guidance electronics and/or a payload.

In the present invention, the locating means are intended to melt at a predetermined temperature which is below the detonation temperature of the propellant material and which is also, preferably, below the temperature at which an automatic ignition initiating device such as that described in our copending patent application, PCT/GB96/00325, referred to above is intended to operate. On melting of the locating means, the resiliently biased retaining means which hold the end closure in position are ejected by the resilient biasing means such that if unwanted ignition of the propellant occurs, the end closure is merely ejected due to a momentary pressure rise caused by the burning propellant. However, once the end closure is ejected it is not possible for the pressure in the casing to rise significantly and thus, the rate of burning of the propellant is consequently very low and much less hazardous.

Preferably, the retaining means are also provided with additional locating means such that under normal firing conditions of the motor, the axial thrust of the burning propellant on the at least one end closure serves to hold the retaining means in their intended positions. Under normal operating conditions where the motor is intentionally ignited, the time of burning of the motor is very short and there is insufficient time for the locating means to heat to a temperature at which they would melt. However, even if melting were to occur, the end closure would be held in position by the additional locating means.

The additional locating means may, for example, comprise co-operating groove and flange means provided in the body portion and retaining means, respectively.

The retaining means may comprise a ring dimensioned to co-operate with the body portion, the ring being split into two or more segments.

An important advantage of the present invention is that all components including the locating means of meltable material may be premachined prior to assembly allowing ease and economy of construction.

A further important advantage of the present invention is that no moving components are employed in normal use, thus ensuring reliability of operation.

The locating means may comprise pins, screws, wedges, rivets or any other suitable means and made of a material melting or beginning to melt a desired predetermined temperature. Such a material may comprise a metal or alloy made, for example, of one or more of tin, lead, bismuth, antimony, cadmium. Other metals may also be employed according to any specific requirements as would be understood by a person skilled in the art.

According to a second aspect of the present invention, there is provided a vehicle such as a rocket or missile having a casing according to the first aspect of the present invention.

BRIEF DESCRIPTION OF THE DRAWINGS

In order that the present invention may be more fully understood, examples will now be described by way of illustration only with reference to the accompanying drawings, of which.

DETAILED DISCUSSION OF PREFERRED EMBODIMENTS

Figure 1:
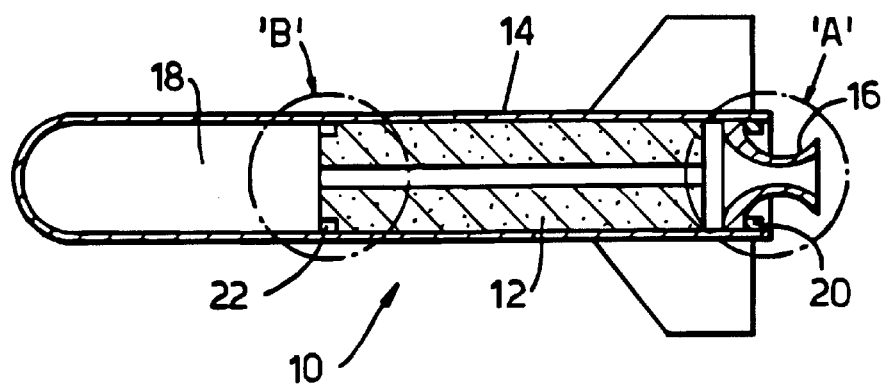
FIG. 1 shows a schematic cross section through a vehicle having a motor casing indicating alternative embodiments according to the present invention.
Figure 2:
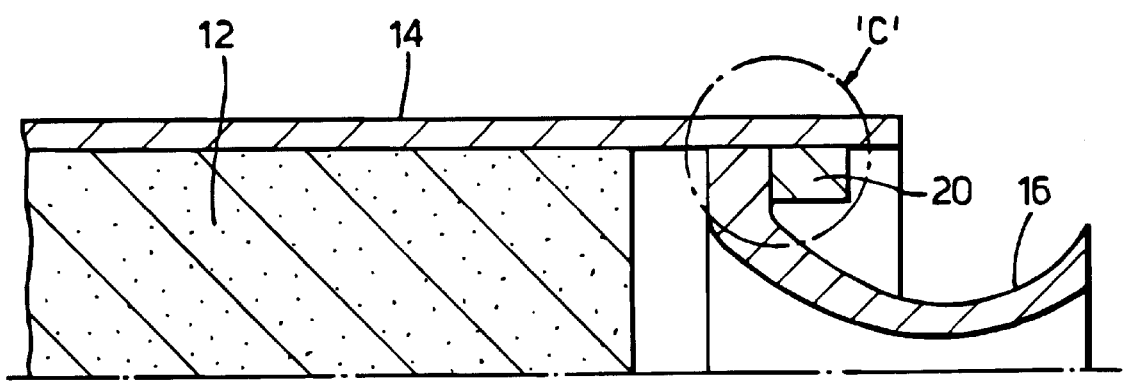
FIG. 2 shows a portion of a motor casing having a detachable nozzle portion.
Figure 3:
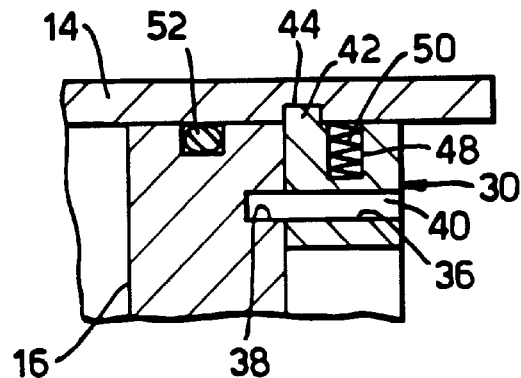
FIG. 3 shows the area "C" of FIG. 2 in more detail.
Figure 5:
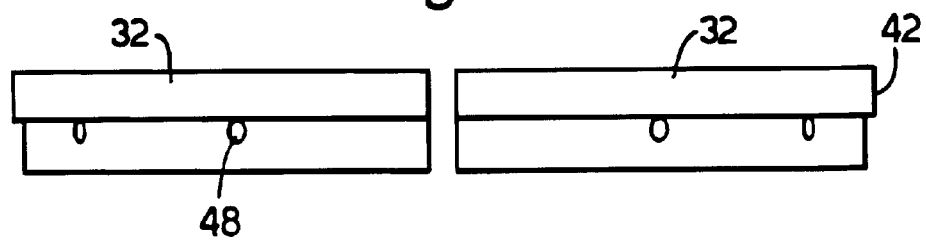
FIG. 5 shows a side view of the retaining means of FIG. 4.
Figure 6:
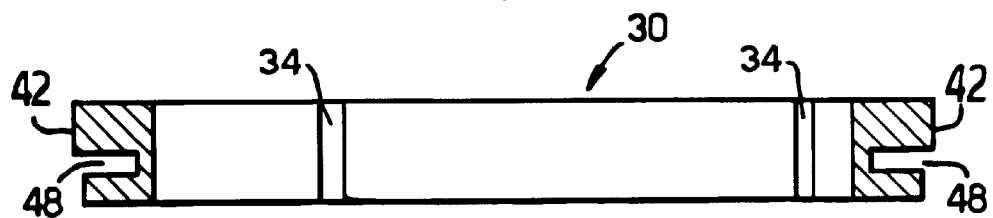
FIG. 6 which shows a cross section through Y—Y of FIG. 4.
Figure 4:
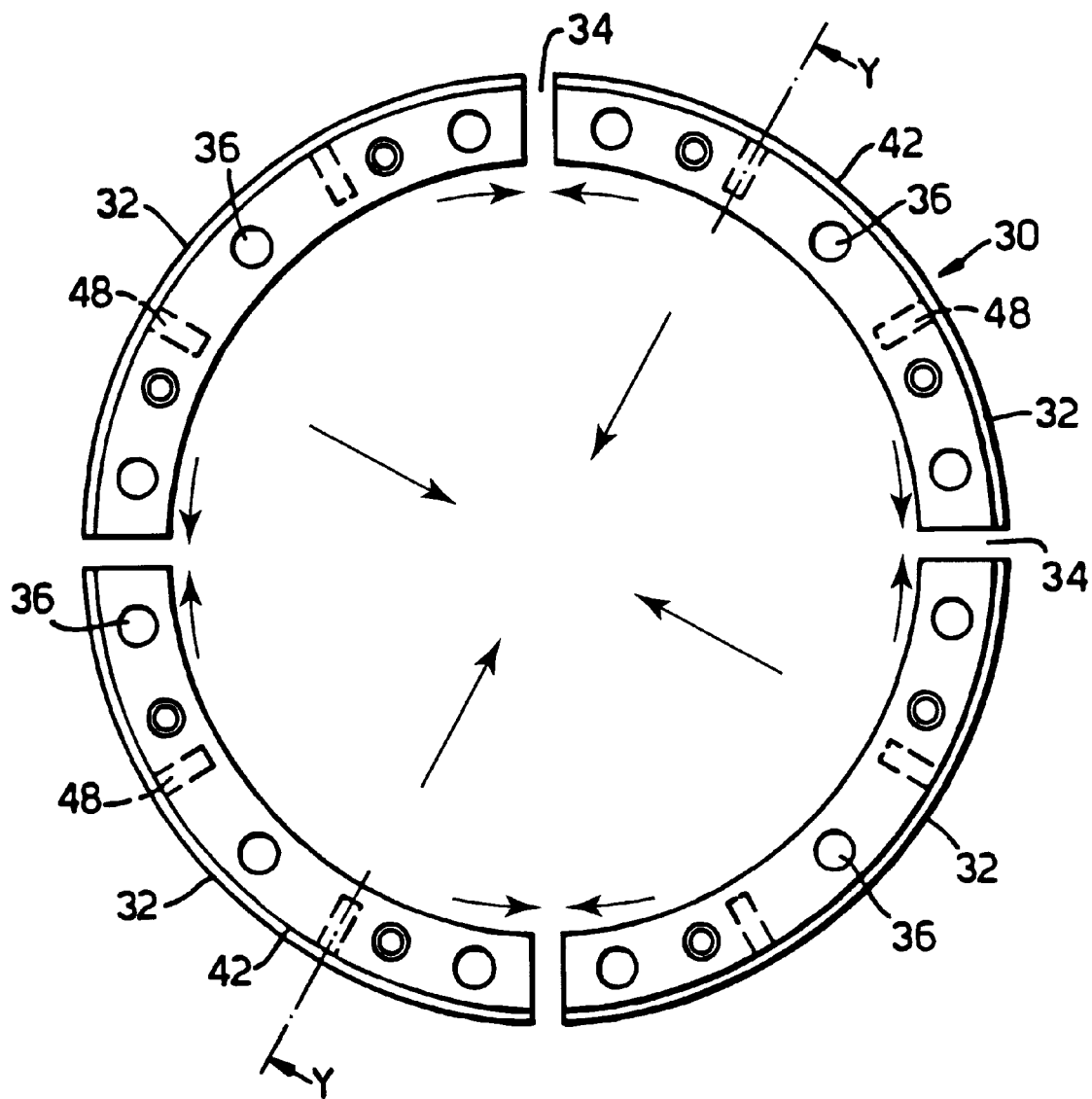
FIG. 4 shows an end view of retaining means shown in FIG. 3.

Referring now to the drawings and where the same features are denoted by common reference numerals.

FIG. 1 shows a schematic cross section through a vehicle 10 having a solid propellant motor 12. The vehicle 10 has a body portion 14 having a closure at one end comprising a nozzle 16 and a closure at the remote end comprising a section 18 having, for example, guidance means and/or a payload (not shown). The closures 16 and 18 are secured in place by means to be described below but shown generally as 20, 22, respectively in areas "A" and "B" of FIG. 1. The motor casing or body portion 14 may employ means to allow ejection of either or both of the closures 16 and/or 18 in the event of unwanted extraneous slow heating thereof. Furthermore, the vehicle may also employ means to ignite the motor 12, prior to detonation, such as are described in our copending patent application, PCT/GB96/00325, referred to above. However, it is to be understood that the operation of such ignition means is effected at a temperature no lower than, or more preferably, greater than that described below with reference to the present invention.

Referring now to FIGS. 2 to 6 which show an embodiment according to the present invention whereby a casing 14 has a closure comprising a nozzle 16. Under normal conditions, the nozzle 16 is held in place by retaining means indicated in FIG. 2 generally at 20 and described in more detail in FIG. 3 which shows the area "C" of FIG. 2. The nozzle 16 is held in place by a retaining ring 30 which is split into four segments 32 having gaps 34 therebetween. The retaining ring segments 32 have axially directed holes 36 which align with holes 38 formed in the nozzle 16. Locating means comprising pins 40 made of a low melting point alloy which melts at a predetermined temperature are fitted into the holes 36, 38 so as to maintain the retaining ring segments 32 and the nozzle 16 in a predetermined radial relationship. The retaining ring segments 32 are also provided with circumferential flange portions 42 which fit into and co-operate with engagement means, in this case a corresponding circumferential groove 44 in the inner surface of the casing or body portion 14, such that the nozzle 16 is maintained in a predetermined axial position. The ring segments 32 are also provided with radially directed blind recesses 48 to house resilient biasing means such as springs 50 which urge the segments 32 radially inwardly against the locating pins 40. A seal member 52 is provided between the casing 14 and nozzle 16.

In operation and under normal firing conditions of the vehicle 10, the motor burns as intended and the axial thrust of the motor 12 is born by the co-operating flange 42 and groove 44. Even if the pins 40 were to melt under normal operating conditions, the axial thrust of the motor on the flange 42 and groove 44 is very much greater than the radial force exerted by the springs 50 tending towards disengagement of the flange and groove. However, due to the short burn time of the motor, it is unlikely that the pins would melt due to poor thermal conductivity of the nozzle and insufficient time.

In the case where the motor 12 is subjected to unwanted slow extraneous heating, the pins 40 melt at a predetermined temperature such as 90° C., for example, and allow the now unrestrained springs 50 to push the segments 32 radially inwardly so as to disengage the flange 42 from the groove 44. Thus, the nozzle 16 is no longer located in the axial direction. Unwanted ignition of the motor 12 causes the nozzle to be instantly ejected from the easing so preventing any pressure rise and causing the motor 12 to burn at a low rate.

The motor 12 may be ignited by a device as described in our copending patent application, PCT/GB96/00325. Where this is the case, such ignition will be at a temperature no lower than, and more preferably, greater than that at which the pins 40 melt so that there is no opportunity for the motor to begin to burn and generate a high axial force between the flange 42 and groove 44.

It will be apparent to those skilled in the art that the forward closure 18 of the vehicle 10 may be arranged to be ejected in a similar manner to the nozzle 16 if desired.

Alternatively, the segments 32 may be provided with one or more circumferentially directed leaf springs, for example, instead of the coil springs 50.

I claim:

1. A solid fuel propellant motor casing, the casing comprising a body portion having a longitudinal axis for containing the propellant, the body portion also including at least one detachable closure portion, the closure portion being maintained in position relative to said body portion by retaining ring segment means, the retaining ring segment means being held in position with engagement means on an inner surface of said body portion and located radially with respect to said body portion axis by locating means against resilient biasing means, said locating means being responsive to temperature such that said locating means melts at a predetermined temperature allowing said resiliently biased retaining ring segment means to move radially inwardly and away from said body portion and allow said at least one closure portion to be ejected from the casing.

2. A casing according to claim 1 wherein the at least one closure portion is a nozzle portion.

3. A casing according to claim 1 wherein the at least one closure portion is a forward portion of a vehicle.

4. A casing according to claim 1 wherein the locating means are made of a metal alloy which melts at a predetermined temperature, the metal or alloy being selected from at least one of the group comprising: tin, lead, bismuth; antimony and cadmium.

5. A casing according to claim 1 further including additional locating means to locate said closure in an axial direction against thrust produced by burning propellant in normal operation.

6. A casing according to claim 5 wherein said additional locating means comprises a cooperating flange on said retaining ring segment means and a groove in said body portion.

7. A casing according to claim 6 wherein said engagement means on an inner surface of said body portion is constituted by the groove.

8. A motor casing according to claim 6 wherein said flange and groove are in permanent engagement in normal operation.

9. A casing according to claim 1 wherein said retaining ring segment means comprises at least one ring segment dimensioned to cooperate with the body portion.

10. A casing according to claim 9 wherein the retaining ring segment means comprises two or more segments.

11. A casing according to claim 1 wherein the locating means comprise one or more of pins, screws, wedges, and rivets.

12. A solid propellant propelled vehicle having a casing according claim 1.

13. A solid fuel propellant motor casing, the casing comprising:
   a body portion having a longitudinal axis for containing the propellant, the body portion also including at least one detachable closure portion;
   retaining ring segment means for maintaining the closure portion in position relative to the body portion;
   engagement means, on an inner surface of said body portion, for holding the retaining ring segment means in position;
   resilient biasing means for biasing said retaining ring segment means radially inward with respect to said body portion;
   locating means for positioning said retaining ring segment means radially with respect to said body portion axis against said resilient biasing means; and
   said locating means being responsive to temperature such that said locating means melts at a predetermined temperature allowing said resiliently biased retaining ring segment means to move radially inwardly of said body portion and allow said at least one closure portion to be ejected from the casing.

14. A solid fuel propellant motor casing, the casing comprising:
   a body portion having a longitudinal axis for containing the propellant, the body portion also including at least one detachable closure portion;
   at least one ring segment for maintaining the closure portion in position relative to the body portion, said at least one ring segment having at least one radially extending flange;
   at least one groove on an inner surface of said body portion, said at least one groove cooperating with said at least one flange on said at least one ring segment for preventing movement of said at least one ring segment in a direction parallel to said longitudinal axis;
   at least one spring for biasing said at least one ring segment radially inward with respect to said body portion; and
   at least one locating pin for restraining said at least one ring segment against radially inward movement under the influence of said at least one spring, said at least one locating pin being of a material so as to fail to restrain said at least one ring segment at a predetermined temperature thereby allowing said at least one spring to move said at least one flange to move radially inwardly of said body portion and out of engagement with said at least one groove, allowing said at least one closure portion to be ejected from the casing.

15. A solid fuel propellant motor casing in accordance with claim 14, wherein said at least one ring segment comprises four ring segments.

16. A solid fuel propellant motor casing in accordance with claim 15, wherein said at least one radially extending flange comprises a single radially extending flange on each of said four ring segments and said at least one groove comprises a single circumferential groove in said body portion.

17. A solid fuel propellant motor casing in accordance with claim 15, wherein said at least one spring comprises at least two springs in each of said four ring segments.

18. A solid fuel propellant motor casing in accordance with claim 15, wherein said at least one locating pin comprises at least three spaced apart locating pins on each of said four one ring segments.

19. A solid fuel propellant motor casing in accordance with claim 14, wherein said at least one radially extending flange comprises a single radially extending flange and said at least one groove comprises a single groove.

20. A solid fuel propellant motor casing in accordance with claim 14, wherein said at least one spring comprises at least two springs in said at least one ring segment.

21. A solid fuel propellant motor casing in accordance with claim 14, wherein said at least one locating pin comprises at least three spaced apart locating pins on said at least one ring segment.

22. A solid fuel propellant motor casing in accordance with claim 14, wherein said detachable closure portion comprises a nozzle portion of said motor.

23. A solid fuel propellant motor casing in accordance with claim 14, wherein said at least one locating pin is comprised of one of tin, lead, bismuth, antimony and cadmium.

24. A solid fuel propellant motor casing in accordance with claim 14, wherein said at least one flange and said at least one groove have rectangular cross sections.

* * * * *